US009430307B2

(12) United States Patent
Yang

(10) Patent No.: US 9,430,307 B2
(45) Date of Patent: Aug. 30, 2016

(54) ELECTRONIC DATA PROCESSING SYSTEM PERFORMING READ-AHEAD OPERATION WITH VARIABLE SIZED DATA, AND RELATED METHOD OF OPERATION

(71) Applicant: SAMSUNG ELECTRONICS CO., LTD., Suwon-si, Geonggi-do (KR)

(72) Inventor: Seung-Soo Yang, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 406 days.

(21) Appl. No.: 14/036,285

(22) Filed: Sep. 25, 2013

(65) Prior Publication Data

US 2014/0089745 A1   Mar. 27, 2014

(30) Foreign Application Priority Data

Sep. 27, 2012  (KR) .................. 10-2012-0107702

(51) Int. Cl.
| G06F 3/06 | (2006.01) |
| G06F 11/07 | (2006.01) |
| G06F 12/08 | (2016.01) |
| G06F 12/00 | (2006.01) |

(52) U.S. Cl.
CPC ......... *G06F 11/073* (2013.01); *G06F 12/0862* (2013.01); *G06F 12/0866* (2013.01); *G06F 2212/171* (2013.01); *Y02B 60/1225* (2013.01)

(58) Field of Classification Search
None
See application file for complete search history.

(56) References Cited

U.S. PATENT DOCUMENTS

| 5,483,641 | A | 1/1996 | Jones et al. |
| 5,619,723 | A | 4/1997 | Jones et al. |
| 5,940,838 | A | 8/1999 | Schmuck et al. |
| 6,775,745 | B1 | 8/2004 | Fry et al. |
| 7,333,993 | B2 | 2/2008 | Fair |
| 7,386,674 | B1 | 6/2008 | Lange |
| 7,529,892 | B2 | 5/2009 | Matsuzawa et al. |
| 7,631,148 | B2 | 12/2009 | Fair |
| 7,711,894 | B1 | 5/2010 | Huang et al. |
| 7,809,883 | B1 | 10/2010 | Fair et al. |
| 8,015,360 | B2 | 9/2011 | Hong et al. |
| 2003/0115410 | A1 | 6/2003 | Shriver |
| 2006/0248278 | A1* | 11/2006 | Beeston ............... G06F 3/0613 711/137 |
| 2008/0133872 | A1 | 6/2008 | Fair |
| 2011/0219194 | A1 | 9/2011 | Okada |

FOREIGN PATENT DOCUMENTS

| JP | 2011182314 | 9/2011 |
| KR | 20100069232 A | 6/2010 |
| KR | 0974514 | 8/2010 |
| KR | 0976590 | 8/2010 |

\* cited by examiner

*Primary Examiner* — Scott Sun
(74) *Attorney, Agent, or Firm* — Volentine & Whitt, PLLC

(57) ABSTRACT

A method of reading data in an electronic system includes detecting whether a trigger signal in the electronic system is enabled, the trigger signal being selectively enabled according to at least one operating condition of the electronic system, as a consequence of detecting that the trigger signal is enabled, changing a size of read-ahead data based on the enabled trigger signal, and performing a read operation based on a read command and the changed size of the read-ahead data.

20 Claims, 9 Drawing Sheets

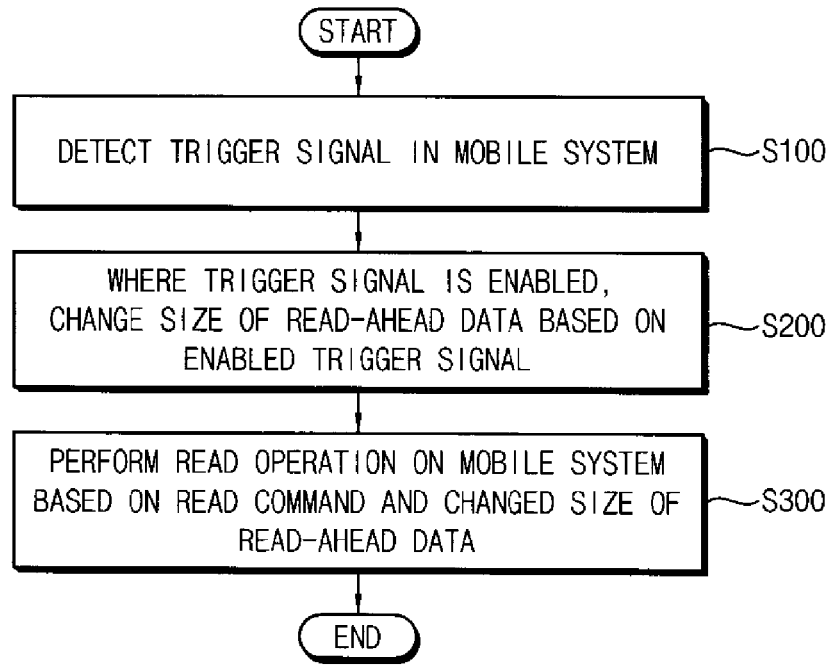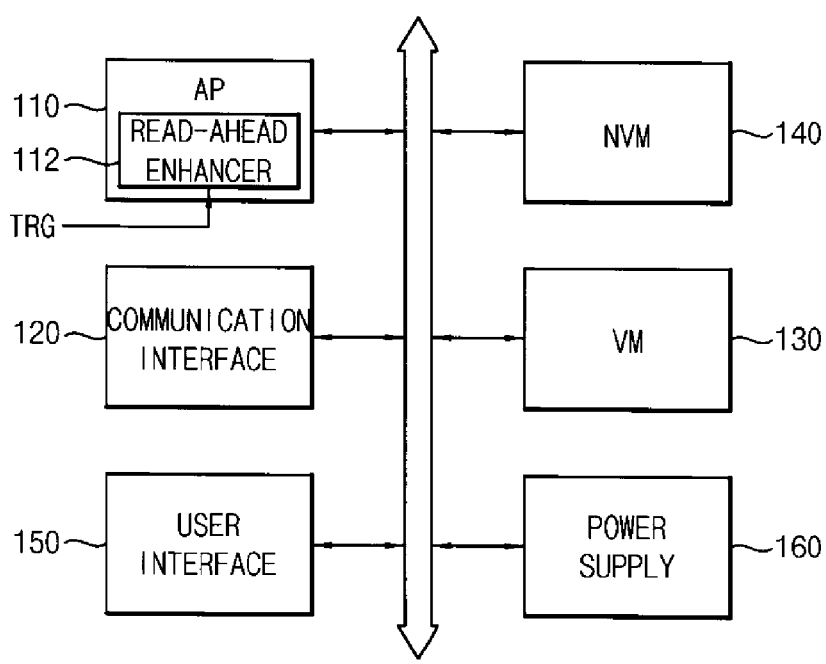

ELECTRONIC DATA PROCESSING SYSTEM PERFORMING READ-AHEAD OPERATION WITH VARIABLE SIZED DATA, AND RELATED METHOD OF OPERATION

CROSS-REFERENCE TO RELATED APPLICATIONS

This application claims priority under 35 USC §119 to Korean Patent Application No. 2012-0107702 filed on Sep. 27, 2012, the subject matter of which is hereby incorporated by reference.

BACKGROUND OF THE INVENTION

The inventive concept relates generally to electronic data processing systems. More particularly, certain embodiments relate to electronic data processing systems performing read-ahead operations with variable sized data, and certain other embodiments relate to methods of operating the electronic data processing systems.

Most electronic data processing systems include multiple memory devices with different operating characteristics. These memory devices may include, for instance, one or more nonvolatile memory devices capable of storing relatively large amounts of data, and one or more volatile memory devices providing relatively fast data access.

During typical operation of such systems, data may be prefetched from a nonvolatile memory device to a volatile memory device to allow efficient access to the data in subsequent operations. In general, an operation that prefetches data from one memory to another memory for subsequent access can be referred to as a read-ahead operation.

SUMMARY OF THE INVENTION

In one embodiment of the inventive concept, a method of reading data in an electronic system comprises detecting whether a trigger signal in the electronic system is enabled, the trigger signal being selectively enabled according to at least one operating condition of the electronic system, as a consequence of detecting that the trigger signal is enabled, changing a size of read-ahead data based on the enabled trigger signal, and performing a read operation based on a read command and the changed size of the read-ahead data.

In another embodiment of the inventive concept, an electronic system comprises an application processor and a memory device. The application processor is configured to execute an operating system (OS) of the electronic system, detect a state of a trigger signal in the electronic system, change a size of read-ahead data based on the detected state of the trigger signal, and perform a read operation in the electronic system based on a read command and the changed size of the read-ahead data. The trigger signal is selectively enabled according to an operating condition of the electronic system, and the size of the read-ahead data indicates an amount of data prefetched before the read operation is required in the mobile system. The memory device is configured to store the OS.

These and other embodiments of the inventive concept can potentially improve performance of mobile systems by prefetching large amounts of data where appropriate.

BRIEF DESCRIPTION OF THE DRAWINGS

The drawings illustrate selected embodiments of the inventive concept. In the drawings, like reference numbers indicate like features.

FIG. 1 is a flowchart illustrating a method of reading data in a mobile system according to an embodiment of the inventive concept.

FIG. 2 is a block diagram illustrating a mobile system according to an embodiment of the inventive concept.

DETAILED DESCRIPTION

Figure 3:
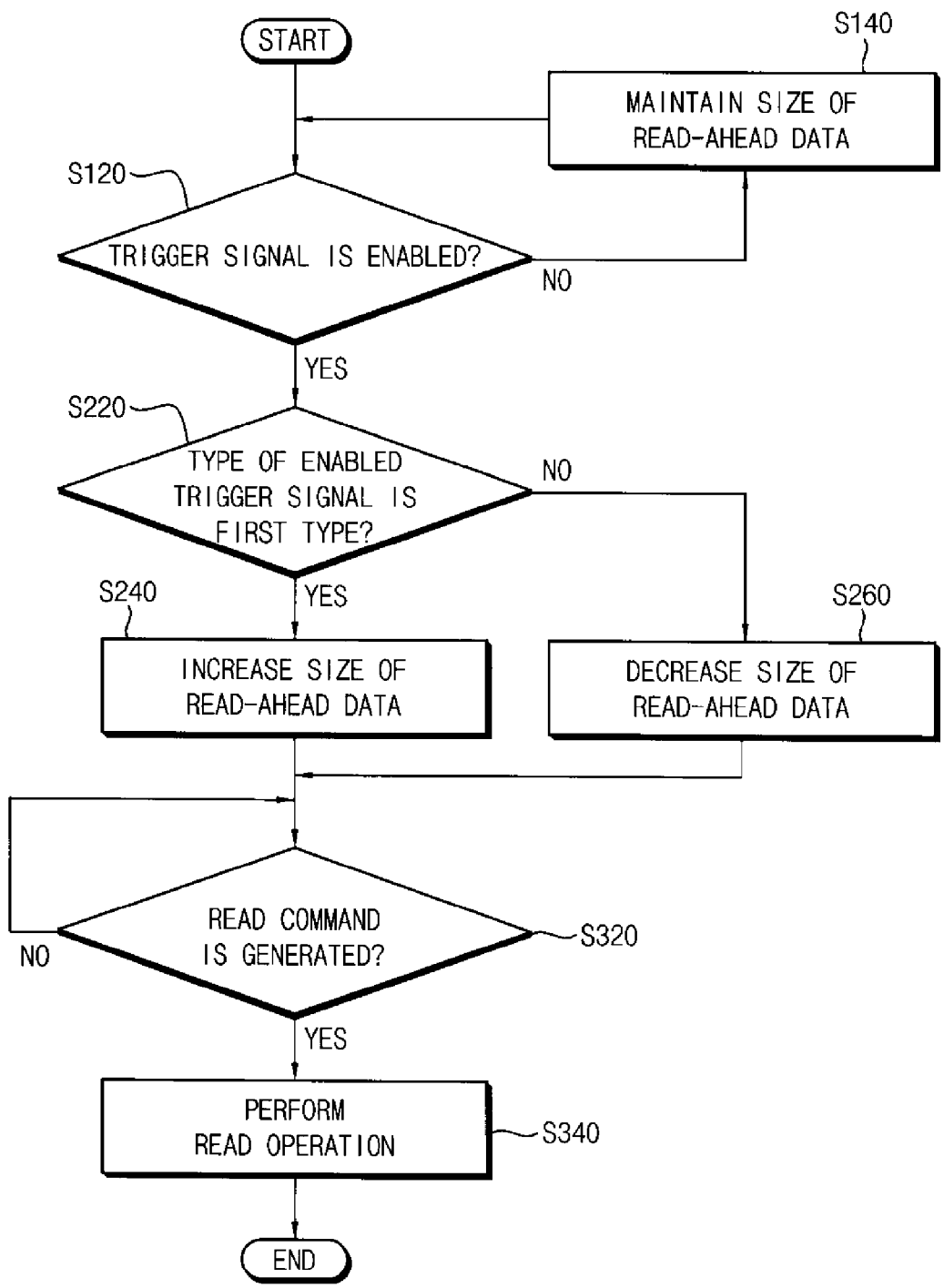
FIG. 3 is a flowchart illustrating a more detailed example of the method illustrated in FIG. 1, according to an embodiment of the inventive concept.

Embodiments of the inventive concept are described below with reference to the accompanying drawings. These embodiments are presented as teaching examples and should not be construed to limit the scope of the inventive concept.

In the description that follows, the terms first, second, etc. may be used to describe various elements, but these elements should not be limited by these terms. Rather, these terms are used merely to distinguish one element from another. For example, a first element could be termed a second element, and, similarly, a second element could be termed a first element, without departing from the scope of the inventive concept. As used herein, the term "and/or" includes any and all combinations of one or more of the associated listed items.

Where an element is referred to as being "connected" or "coupled" to another element, it can be directly connected or coupled to the other element or intervening elements may be present. In contrast, where an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concept. As used herein, the singular forms "a," "an" and "the" are intended to include the plural forms as well, unless the context clearly indicates otherwise. Terms such as "comprises," "comprising," "includes" and/or "including," where used herein, indicate the presence of stated features but do not preclude the presence or addition of one or more other features.

Unless otherwise defined, all terms (including technical and scientific terms) used herein have the same meaning as commonly understood by one of ordinary skill in the art to which this inventive concept belongs. Terms such as those defined in commonly used dictionaries should be interpreted as having a meaning that is consistent with their meaning in the context of the relevant art and will not be interpreted in an idealized or overly formal sense unless expressly so defined herein.

In general, the described embodiments relate to electronic data processing systems in which a read-ahead operation is performed with variable sized data. The size of data may change in response to a trigger signal, which can be enabled in response to a detected operating condition of the data processing system. The detected operating condition may be for instance, the presence of an external device connected to the electronic data processing system, or the execution of a predetermined process or application.

Several embodiments are described below with reference to mobile devices such as smart phones. Nevertheless, the inventive concept is not limited to mobile devices and can be embodied in other types of electronic data processing systems.

FIG. 1 is a flowchart illustrating a method of reading data in a mobile system according to an embodiment of the inventive concept. In the method of FIG. 1, a mobile system reads data from an internal storage device and/or an external storage device using a read-ahead operation. In the read-ahead operation, data is prefetched before a read operation is required in the mobile system and the prefetched data is read where the read operation is required in the mobile system. Where data is read by the read-ahead operation, read performance for large amounts of data may be improved.

Referring to FIG. 1, a trigger signal is detected in the mobile system (S100). In other words, enablement of the trigger signal, or a transition of the state of the trigger signal is detected. In response to detection of the trigger signal, a size of read-ahead data is changed (S200). The term "read-ahead data" here refers to data to be transferred from one memory to another memory during a read-ahead operation. Thereafter, a read operation is performed in the mobile system based on a read command and the changed size of the read-ahead data (S300).

The trigger signal is selectively enabled according to a read condition of the mobile system. In general, the trigger signal may comprise multiple signals, and each of the signals in the trigger signal may be enabled where the mobile system has a predetermined operating condition (e.g., a predetermined read condition). In some embodiments, the trigger signal may be a single signal, and at least one trigger pulse may be generated on the trigger signal where the mobile system has a predetermined operating condition. The size of the read-ahead data indicates the amount of data prefetched before the read operation is required in the mobile system.

Where a large amount of data (e.g., a multimedia file) is sequentially read, read performance may be improved by employing the read-ahead operation. However, where a small amount data (e.g., a system file) is randomly read, read performance for the small amount data may be degraded by employing the read-ahead operation. Accordingly, the selective use of the read-ahead operation based on a trigger signal can provide improved read performance.

The method of FIG. 1 can be viewed to a technique using a context-aware based dynamic read-ahead scheme. In this scheme, an operating condition (e.g., a read condition) of the mobile system can be recognized based on the trigger signal. Based on the recognized read condition of the mobile system, the size of the read-ahead data may be increased where large-scale data is sequentially read in the mobile system, or the size of the read-ahead data may be decreased where small amount data is randomly read in the mobile system. Accordingly, the mobile system employing the method can have relatively improved read performance, relatively high operating speed, and relatively low power consumption.

FIG. 2 is a block diagram illustrating a mobile system according to an embodiment of the inventive concept.

Referring to FIG. 2, a mobile system 100 comprises an application processor (AP) 110, a communication interface 120, a volatile memory device (VM) 130, a nonvolatile memory device (NVM) 140, a user interface 150, and a power supply 160. In various alternative embodiments, mobile system 100 may a mobile system, such as a mobile phone, a smart phone, a tablet computer, a laptop computer, a personal digital assistant (PDA), a portable multimedia player (PMP), a digital camera, a music player, a portable game console, a camcorder, a video player, or a navigation system, for example.

Application processor 110 may execute an operating system (OS) for operating mobile system 100. In addition, application processor 110 may execute various applications, such as an internet browser, a game application, or a video player application, for example. In various alternative embodiments, application processor 110 may comprise a single processor core or multiple processor cores. For example, application processor 110 may be a multi-core processor, such as a dual-core processor, a quad-core processor, or a hexa-core processor. In some embodiments, application processor 110 may further comprise a cache memory located inside or outside application processor 110.

Communication interface 120 may perform wired or wireless communication with an external device (e.g., an external storage device). For example, communication interface 120 may perform an Ethernet communication, near field communication (NFC), radio frequency identification (RFID) communication, mobile telecommunication, memory card communication, universal serial bus (USB) communication, wireless internet, wireless fidelity (Wi-Fi), global positioning system (GPS), Bluetooth (BT), etc. For example, communication interface 120 may comprise a baseband chipset and may support global system for mobile communication (GSM), general packet radio system (CPRS), wideband code division multiple access (WCDMA), high speed uplink/downlink packet access (HSxPA), etc.

Volatile memory device 130 stores instructions and/or data processed by application processor 110, and/or it serves as a working memory. Volatile memory device 130 may be implemented by a dynamic random access memory (DRAM), a static random access memory (SRAM), a mobile DRAM, a double data rate (DDR) synchronous DRAM (SDRAM), a low power DDR (LPDDR) SDRAM, or a graphic DDR (GDDR) SDRAM, for instance.

Nonvolatile memory device 140 may store a boot image for booting mobile system 100, an OS for operating mobile system 100, a file system associated with the OS, a device driver associated with the external device that is connected to mobile system 100, and/or applications executed by mobile system 100. Nonvolatile memory device 140 may be implemented by an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), or a ferroelectric random access memory (FRAM), for example.

User interface 150 comprises at least one input device, such as a keypad, a touch screen, etc., and at least one output device, such as a display device, a speaker, etc. Power supply 160 supplies power to mobile system 100. In some embodiments, mobile system 100 further comprises a camera image processor (CIS). In some embodiments, mobile system 100 may further comprise a storage device, such as a memory card, a solid state drive (SSD), a CD-ROM, etc., that stores the large-scale data (e.g., the multimedia file such as audio, image and video files).

In some embodiments, mobile system 100 and/or components of mobile system 100 may be packaged in various package types or configurations, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP).

Application processor 110 comprises a read-ahead enhancer 112. Read-ahead enhancer 112 detects a trigger signal TRG, which is selectively enabled depending on read condition of mobile system 100, on mobile system 100 and may control a size of read-ahead data based on trigger signal TRG. For example, where trigger signal TRG is enabled, read-ahead enhancer 112 may change (e.g., increase or decrease) the size of the read-ahead data based on the enabled trigger signal. Where trigger signal TRG is disabled, read-ahead enhancer 112 may maintain the size of the read-ahead data based on the disabled trigger signal.

In some embodiments, at least a portion of read-ahead enhancer 112 is implemented as hardware and is included in application processor 110. In other embodiments, at least a portion of read-ahead enhancer 112 is implemented as software and is stored in nonvolatile memory device 140 or the storage device in the form of program codes to be executed by application processor 110.

FIG. 3 is a flowchart illustrating a more detailed example of the method of FIG. 1, according to an embodiment of the inventive concept.

Referring to FIGS. 2 and 3, in operation S100, which detects trigger signal TRG, read-ahead enhancer 112 determines whether trigger signal TRG is enabled (S120). In an example embodiment, trigger signal TRG comprises a first trigger signal, a second trigger signal and a third trigger signal. The first trigger signal is enabled where mobile system 100 is connected to an external storage device. The second trigger signal is enabled where a predetermined application or a predetermined process is executed by mobile system 100. The third trigger signal is enabled where predetermined data is sequentially read by mobile system 100.

In another example embodiment, trigger signal TRG comprises a fourth trigger signal, a fifth trigger signal, and a sixth trigger signal. The fourth trigger signal is enabled where the external storage device is disconnected from mobile system 100. The fifth trigger signal is enabled where execution of the predetermined application or the predetermined process by mobile system 100 is terminated. The sixth trigger signal is enabled where the operation for sequentially reading the predetermined data by mobile system 100 is terminated.

As described above, trigger signal TRG may comprise multiple signals, e.g., first through sixth trigger signals. In this case, in operation S120, read-ahead enhancer 112 determines whether at least one of the signals constituting trigger signal TRG is enabled. In other words, it determines whether at least one of the trigger signals has transitioned from a first logic level (e.g., a logic "low" level) to a second logic level (e.g., a logic "high" level). An operation to enable the first trigger signal, e.g., an operation to connect mobile system 100 with the external storage device, may be referred to as a "mounting operation." An operation to enable the second trigger signal, e.g., an operation to execute the predetermined application or the predetermined process on mobile system 100, may be referred to as a "launching operation." An operation to enable the third trigger signal, e.g., an operation to sequentially read the predetermined data on mobile system 100, may be referred to as a "large-scale read operation."

Where trigger signal TRG is disabled (S120=NO), e.g., where all the signals constituting trigger signal TRG are disabled, read-ahead enhancer 112 maintains the size of the read-ahead data (S140). Read-ahead enhancer 112 may be on standby for the enablement of trigger signal TRG. Otherwise, where trigger signal TRG is enabled (S120=YES), e.g., where at least one of the signals constituting trigger signal TRG is enabled, read-ahead enhancer 112 changes the size of the read-ahead data based on the enabled trigger signal.

In operation S200, which changes the size of the read-ahead data, read-ahead enhancer 112 determines a type of the enabled trigger signal (S220). For example, the type of the enabled trigger signal may be one of a first type for increasing the size of the read-ahead data and a second type for decreasing the size of the read-ahead data.

Where the type of the enabled trigger signal is the first type (S220=YES), e.g., where at least one of the first, second and third trigger signals is enabled, read-ahead enhancer 112 increases the size of the read-ahead data based on the enabled trigger signal (S240). Where the type of the enabled trigger signal is the second type (S220=NO), e.g., where at least one of the fourth, fifth and sixth trigger signals is enabled, read-ahead enhancer 112 decreases the size of the read-ahead data based on the enabled trigger signal (S260).

The size of the read-ahead data may be modified (e.g., increased or decreased) depending on various conditions. For instance, the size of the read-ahead data may be modified according to a type of the external storage device that is connected to mobile system 100, a type of a communication interface between mobile system 100 and the external storage device, a type of the predetermined application or the predetermined process that is executed by mobile system 100, a type or a size of the predetermined data that is sequentially read by mobile system 100, an authority of mobile system 100, a user identification (ID) of mobile system 100, a group ID of mobile system 100, etc. For example, a variation of the size of the read-ahead data may increase as the amount of data to be read increases.

In operation S300, which performs the read operation, application processor 110 determines whether a read command is generated (S320). Where the read command is generated (S320=YES), mobile system 100 performs the read operation based on the read command and the changed size of the read-ahead data (S340). Where the read command is not generated (S320=NO), application processor 110 may be on standby for the generation of the read command.

In some embodiments, the external storage device connected to mobile system 100 comprises a memory card, a secure digital (SD) card, a multimedia card (MMC), an embedded MMC (eMMC), a compact flash (CF) card, a USB storage device, or a camera device, for example. The external storage device may communicate with mobile system 100 through a memory card interface, an USB interface, a wireless USB interface, an Ethernet interface, a wireless local area network (WLAN) interface, a Bluetooth interface, a NFC interface, a RFID interface, or a media transfer protocol (MTP) interface, for instance.

In some embodiments, the predetermined application or the predetermined process executed by mobile system 100 comprises a multimedia file player application, a multimedia file editor application, a multimedia file production application, a data download application, a data streaming application, or an installation process for an application. The predetermined data sequentially read by mobile system 100 comprises the multimedia file (e.g., the audio, image and video files) or a file having a size larger than a reference size.

FIGS. 4-11 are diagrams for explaining various examples of the method of FIG. 1, according to different embodiments of the inventive concept. These examples show how the method can be employed in different operating conditions of an electronic data processing system.

Figure 4:
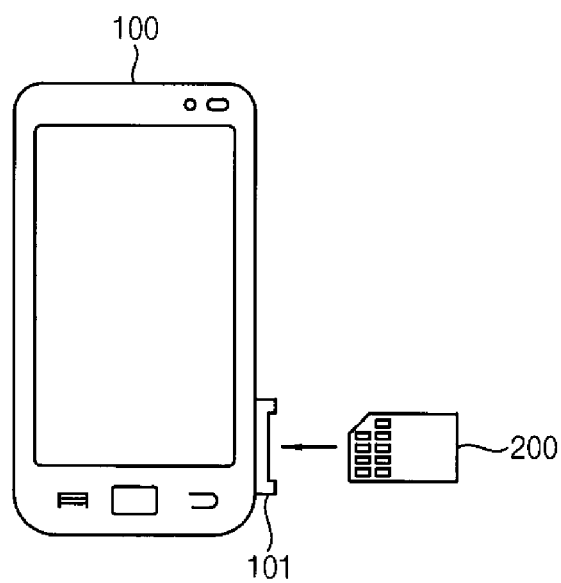
FIG. 4 is a diagram for explaining one example of the method of FIG. 1, according to an embodiment of the inventive concept.

Referring to FIG. 4, trigger signal TRG is enabled where a memory card 200 is inserted in a memory card socket 101 of mobile system 100, e.g., where a direct mounting operation is performed by connecting mobile system 100 with memory card 200. In the example of FIG. 4, the first trigger signal corresponding to the mounting operation is enabled. Read-ahead enhancer 112 in FIG. 2 increases the size of the read-ahead data where memory card 200 is mounted on a file system of mobile system 100. As described above with reference to FIGS. 2 and 3, memory card 200 may be connected to the file system of mobile system 100 by the memory card interface, the USB interface, or the like. Memory card 200 may be substituted with various alternative types of storage cards, such as an SD card, an MMC, an eMMC, or a CF card, for example.

Figure 5:
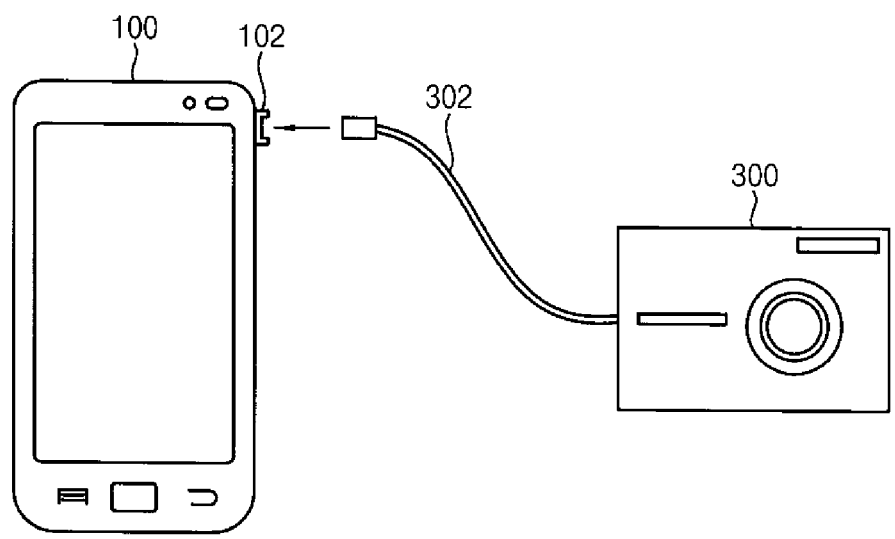
FIG. 5 is a diagram for explaining another example of the method of FIG. 1, according to an embodiment of the inventive concept.

Referring to FIG. 5, trigger signal TRG is enabled where a data transmission line 302 connected to a camera device 300 is inserted in a socket 102 of mobile system 100, e.g., where a wired mounting operation is performed by connecting mobile system 100 with camera device 300. In the example of FIG. 5, the first trigger signal corresponding to the mounting operation is enabled. Read-ahead enhancer 112 in FIG. 2 may increase the size of the read-ahead data where camera device 300 is mounted on the file system of mobile system 100. As described above with reference to FIGS. 2 and 3, camera device 300 may be connected to the file system of mobile system 100 by the USB interface, the MTP interface, or the like. Camera device 300 may be substituted with any device that generates the multimedia file, such as the camcorder, a voice recorder, or the like.

Figure 6:
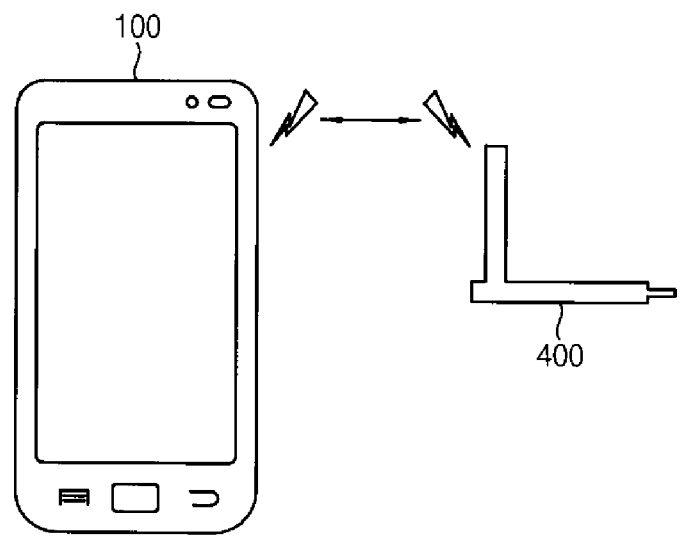
FIG. 6 is a diagram for explaining another example of the method of FIG. 1, according to an embodiment of the inventive concept.

Referring to FIG. 6, trigger signal TRG is enabled where a wireless mounting operation is performed by connecting mobile system 100 with a storage device 400. In the example of FIG. 6, the first trigger signal corresponding to the mounting operation is enabled. Read-ahead enhancer 112 in FIG. 2 increases the size of the read-ahead data where storage device 400 is mounted on the file system of mobile system 100. As described above with reference to FIGS. 2 and 3, storage device 400 may be connected to the file system of mobile system 100 by the wireless USB interface, the Bluetooth interface, the NFC interface, the RFID interface, or the like.

Figure 7:
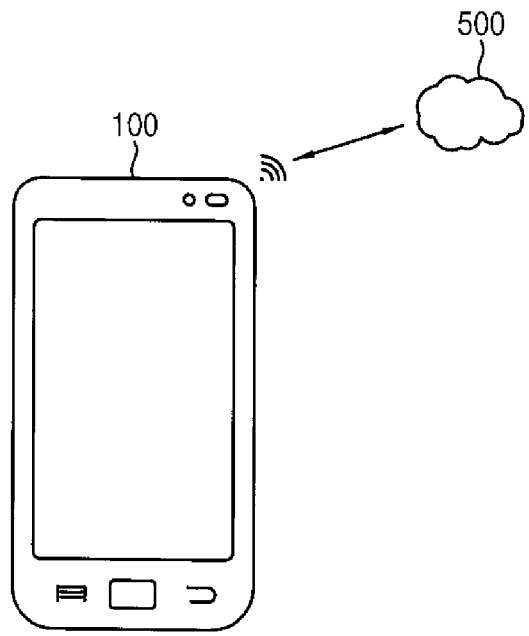
FIG. 7 is a diagram for explaining another example of the method of FIG. 1, according to an embodiment of the inventive concept.

Referring to FIG. 7, trigger signal TRG may be enabled where the launching operation is performed by executing a server access application on mobile system 100. Mobile system 100 accesses a data server 500, such as a file transfer protocol (FTP) server, a cloud server, a web hard, etc., by the server access application. In the example of FIG. 7, the second trigger signal corresponding to the launching operation is enabled. Read-ahead enhancer 112 in FIG. 2 increases the size of the read-ahead data where the server access application is launched on mobile system 100.

Figure 8:
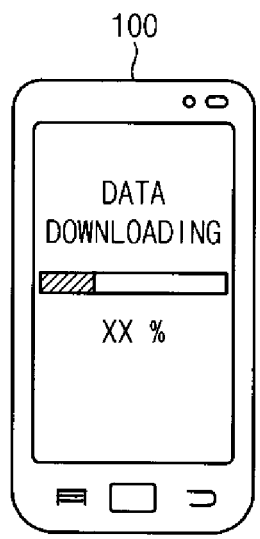
FIG. 8 is a diagram for explaining another example of the method of FIG. 1, according to an embodiment of the inventive concept.

Referring to FIG. 8, trigger signal TRG is enabled where the launching operation is performed by executing the data download application on mobile system 100. In the example of FIG. 8, the second trigger signal corresponding to the launching operation is enabled. Read-ahead enhancer 112 in FIG. 2 increases the size of the read-ahead data where the data download application is launched on mobile system 100. As described above with reference to FIGS. 2 and 3, the data download application may be substituted with the data streaming application, or the like.

Figure 9:
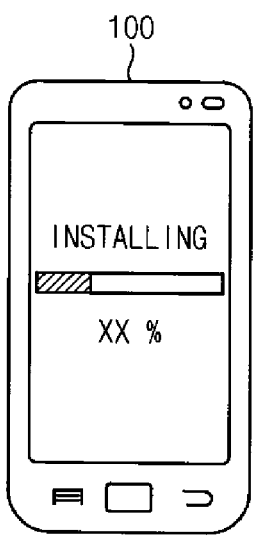
FIG. 9 is a diagram for explaining another example of the method of FIG. 1, according to an embodiment of the inventive concept.

Referring to FIG. 9, trigger signal TRG is enabled where the launching operation is performed by installing an application on mobile system 100. In the example of FIG. 9, the second trigger signal corresponding to the launching operation is enabled. Read-ahead enhancer 112 in FIG. 2 increases the size of the read-ahead data where mobile system 100 starts to install the application.

Figure 10:
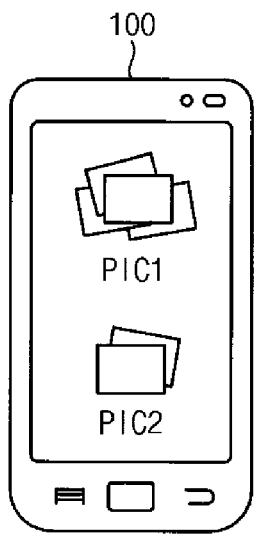
FIG. 10 is a diagram for explaining another example of the method of FIG. 1, according to an embodiment of the inventive concept.

Referring to FIG. 10, trigger signal TRG is enabled where the launching operation is performed by executing the multimedia file player application on mobile system 100. In the example of FIG. 10, the second trigger signal corresponding to the launching operation is enabled. Read-ahead enhancer 112 in FIG. 2 increases the size of the read-ahead data where the multimedia file player application is launched on mobile system 100. As described above with reference to FIGS. 2 and 3, the multimedia file player application may be substituted with the multimedia file editor application, the multimedia file production application, or the like.

Figure 11:
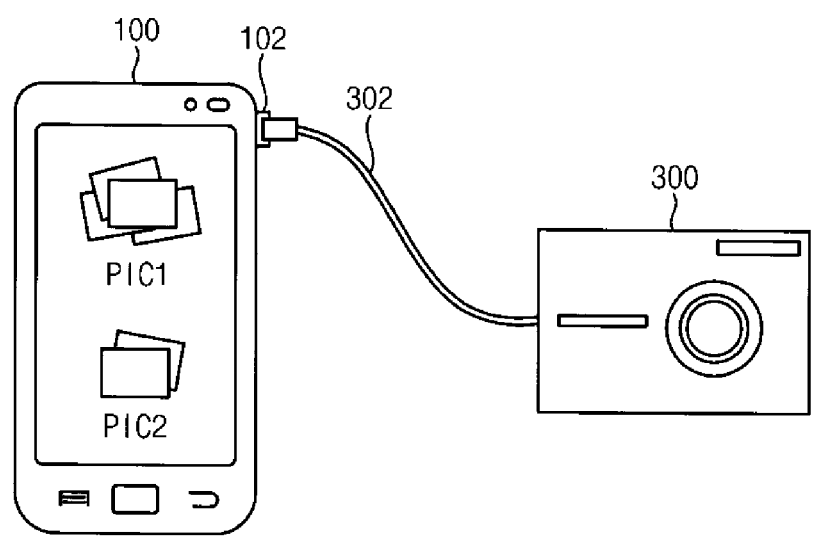
FIG. 11 is a diagram for explaining another example of the method of FIG. 1, according to an embodiment of the inventive concept.

Referring to FIG. 11, trigger signal TRG is enabled where the wired mounting operation is performed by connecting mobile system 100 with camera device 300 and where the launching operation is performed by executing the multimedia file player application on mobile system 100. In the example of FIG. 11, the first trigger signal corresponding to the mounting operation and the second trigger signal corresponding to the launching operation is enabled. In addition, the third trigger signal corresponding to the large-scale read operation is also enabled where the large-scale read operation is performed by sequentially reading a multimedia file stored in camera device 300 by mobile system 100 using the multimedia file player application. In other words, at least two of the signals constituting trigger signal TRG may be enabled.

Although not described above with reference to FIGS. 4, 5 and 6, a large-scale read operation may also be performed where mobile system 100 sequentially reads a multimedia file or a file having a size larger than the reference size from memory card 200 in FIG. 4, camera device 300 in FIG. 5 or storage device 400 in FIG. 6. In these situations, the third trigger signal corresponding to the large-scale read operation may also be enabled.

Although not described above with reference to FIGS. 7 and 8, the large-scale read operation may also be performed where mobile system 100 sequentially reads a file, which has a size larger than the reference size and stored in an internal storage device of mobile system 100 from data server 500 in FIG. 7 or by the data download application in FIG. 8. In addition, although not described above with reference to FIGS. 9 and 10, the large-scale read operation may also be performed where mobile system 100 sequentially reads a file, which has a size larger than the reference size and corresponds to the application in FIG. 9 to be installed, from the internal storage device of mobile system 100 or where mobile system 100 sequentially reads a multimedia file stored in the internal storage device of mobile system 100 by the multimedia file player application in FIG. 10. In these situations, the third trigger signal corresponding to the large-scale read operation may also be enabled.

Where the at least two of the first, second and third trigger signals are enabled, read-ahead enhancer 112 in FIG. 2 may increase the size of the read-ahead data based on all the enabled at least two of the first, second and third trigger signals or based on one of the enabled at least two of the first, second and third trigger signals, as will be described below with reference to FIGS. 12 and 13.

Figure 12:
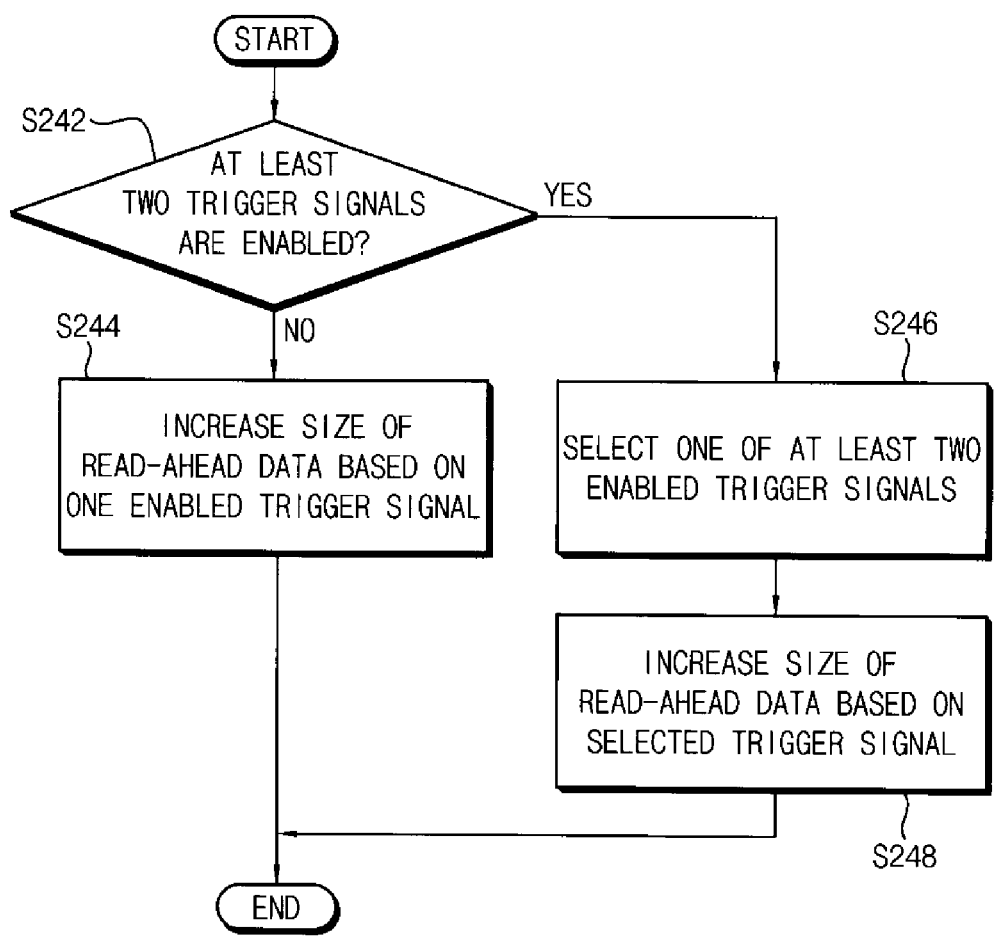
FIG. 12 is a flowchart illustrating an example of an operation S240 in the method of FIG. 3, according to an embodiment of the inventive concept.
Figure 13:
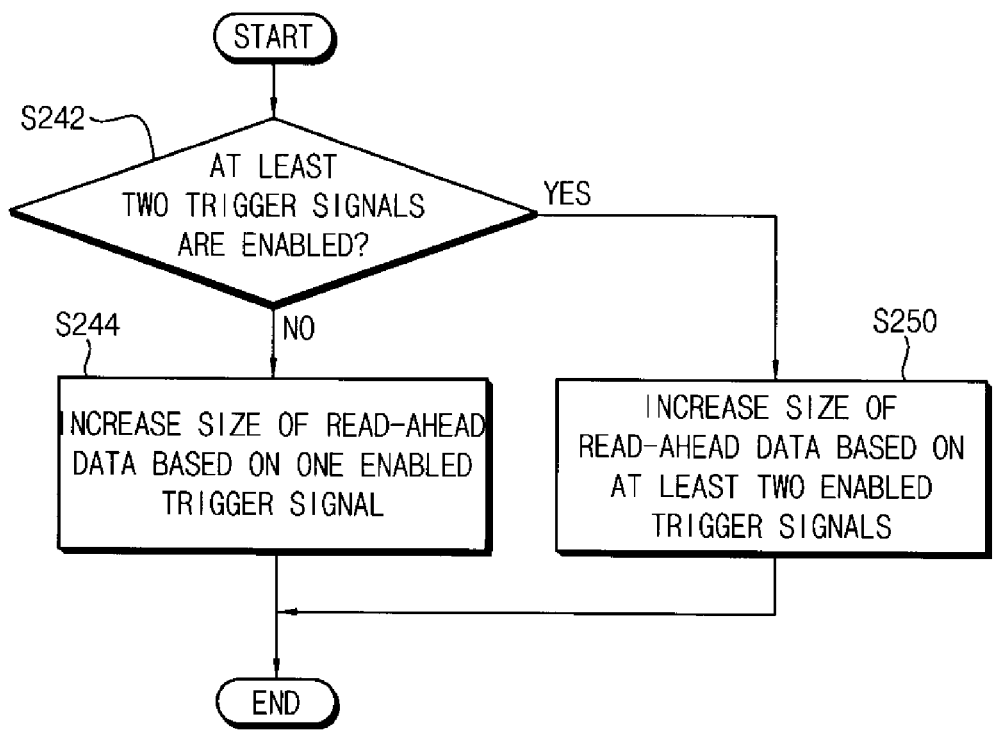
FIG. 13 is a flowchart illustrating another example of an operation S240 in the method of FIG. 3, according to an embodiment of the inventive concept.

FIGS. 12 and 13 are flowcharts illustrating examples of operation S240 in FIG. 3.

Referring to FIGS. 2, 3 and 12, in operation S240, read-ahead enhancer 112 determines whether the at least two of the first, second and third trigger signals are enabled (S242). Where one of the first, second and third trigger signals is enabled (S242=NO), read-ahead enhancer 112 increases the size of the read-ahead data based on the enabled one of the first, second, and third trigger signals (S244).

Where the at least two of the first, second and third trigger signals are enabled (S242=YES), read-ahead enhancer 112 selects one of the at least two of the first, second, and third trigger signals (S246). For example, where the first and second trigger signals are enabled, read-ahead enhancer 112 selects a previously enabled one of the first and second trigger signals or a subsequently enabled one of the first and second trigger signals. As another example, where the first and second trigger signals are enabled, read-ahead enhancer 112 selects an enabled one of the first and second trigger signals, which causes a relatively large variation of the size of the read-ahead data, or an enabled another one of the first and second trigger signals, which causes a relatively small variation of the size of the read-ahead data. Read-ahead enhancer 112 increases the size of the read-ahead data based on the selected trigger signal (S248).

Referring to FIGS. 2, 3 and 13, in operation S240, read-ahead enhancer 112 determines whether the at least two of the first, second and third trigger signals are enabled (S242). Where one of the first, second and third trigger signals is enabled (S242=NO), read-ahead enhancer 112 increases the size of the read-ahead data based on the enabled one of the first, second and third trigger signals (S244). Where the at least two of the first, second and third trigger signals are enabled (S242=YES), read-ahead enhancer 112 increases the size of the read-ahead data based on the enabled at least two of the first, second and third trigger signals (S250). For example, it is assumed that the size of the read-ahead data is increased by X based on the first trigger signal and the size of the read-ahead data is increased by Y based on the second trigger signal. Where the first and second trigger signals are enabled, the size of the read-ahead data is increased by (X+Y).

The above description presents examples of enabling the at least one of the first, second and third trigger signals. Examples of enabling the fourth, fifth and sixth trigger signals may be similar to the examples of enabling the at least one of the first, second and third trigger signals. For example, the fourth trigger signal corresponding to an end of the mounting operation may be enabled where the mounting operation is released by disconnecting memory card 200 from memory card socket 101 of mobile system 100 (e.g., in the example of FIG. 4) or by disconnecting data transmission line 302 of camera device 300 from socket 102 of mobile system 100 (e.g., in the example of FIG. 5). Read-ahead enhancer 112 in FIG. 2 may decrease the size of the read-ahead data where the mounting operation is released on mobile system 100. The fifth trigger signal corresponding to an end of the launching operation may be enabled where the launching operation is released by terminating the execution of the server access application (e.g., in the example of FIG. 7) or by terminating the execution of the multimedia file player application (e.g., in the example of FIG. 10). Read-ahead enhancer 112 in FIG. 2 may decrease the size of the read-ahead data where the launching operation is released on mobile system 100. The sixth trigger signal corresponding to an end of the large-scale read operation may be enabled where the large-scale read operation is released by terminating the operation for sequentially reading the multimedia file or the file having a size larger than the reference size. Read-ahead enhancer 112 in FIG. 2 may decrease the size of the read-ahead data where the large-scale read operation is released on mobile system 100.

In addition, examples of operation S260 based on the enabled at least one of the fourth, fifth and sixth trigger signals may be similar to the examples of operation S240 based on the enabled at least one of the first, second and third trigger signals. For example, where one of the fourth, fifth and sixth trigger signals is enabled, read-ahead enhancer 112 may decrease the size of the read-ahead data based on the enabled one of the fourth, fifth and sixth trigger signals. Where at least two of the fourth, fifth and sixth trigger signals are enabled, read-ahead enhancer 112 may select one of the at least two of the fourth, fifth and sixth trigger signals and may decrease the size of the read-ahead data based on the selected trigger signal, or may decrease the size of the read-ahead data based on the enabled at least two of the fourth, fifth and sixth trigger signals.

In some embodiments, the fourth trigger signal may be omitted. In one example of omitting the fourth trigger signal, the first trigger signal transitions from the first logic level to the second logic level and maintains the second logic level while the mounting operation is performed, and it transitions from the second logic level to the first logic level and may maintain the first logic level where the mounting operation is released. In other words, the first trigger signal corresponding to the mounting operation and the fourth trigger signal corresponding to the end of the mounting operation may be implemented as a single trigger signal. Similarly, the fifth and sixth trigger signals may be omitted.

Figure 14:
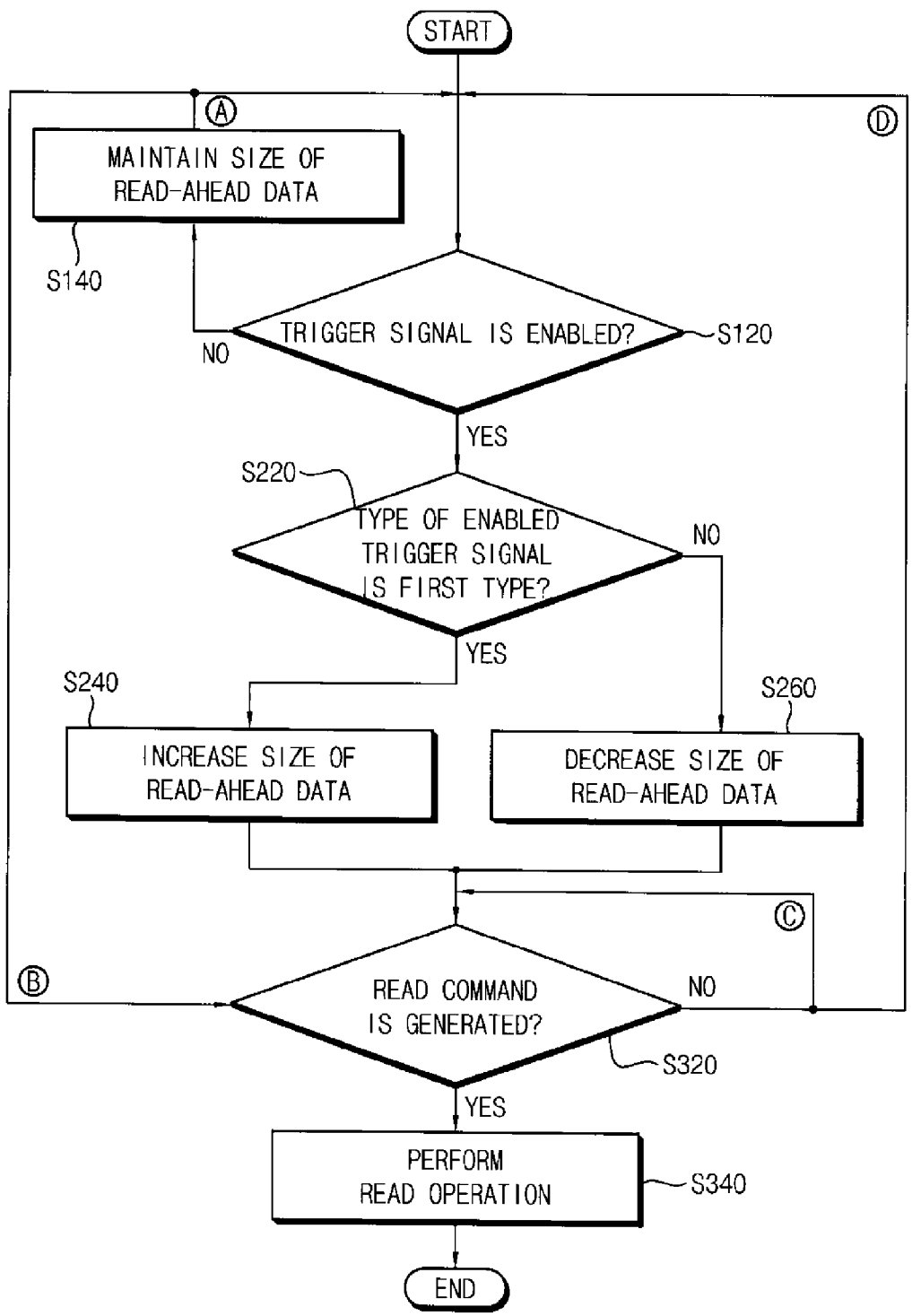
FIG. 14 is a flowchart illustrating another more detailed example of the method illustrated in FIG. 1, according to an embodiment of the inventive concept.

FIG. 14 is a flowchart illustrating another more detailed example of the method of FIG. 1, according to an embodiment of the inventive concept.

Referring to FIGS. 2 and 14, read-ahead enhancer 112 determines whether trigger signal TRG is enabled (S120). Where trigger signal TRG is disabled (S120=NO), read-ahead enhancer 112 maintains the size of the read-ahead data (S140). Read-ahead enhancer 112 is on standby for the enablement of trigger signal TRG (branch "A" in FIG. 14), or application processor 110 is on standby for the generation of the read command (branch "B" in FIG. 14). Where trigger signal TRG is disabled and the read command is generated, mobile system 100 performs the read operation based on the read command and the maintained size of the read-ahead data.

Where trigger signal TRG is enabled (S120=YES), read-ahead enhancer 112 determines a type of the enabled trigger signal (S220). Where the type of the enabled trigger signal is the first type (S220=YES), read-ahead enhancer 112 increases the size of the read-ahead data based on the enabled trigger signal (S240). Where the type of the enabled trigger signal is the second type (S220=NO), read-ahead enhancer 112 decreases the size of the read-ahead data based on the enabled trigger signal (S260).

Next, application processor 110 determines whether the read command is generated (S320). Where the size of the read-ahead data is changed and the read command is generated (S320=YES), mobile system 100 performs the read operation based on the read command and the changed size of the read-ahead data (S340).

Where the read command is not generated (S320=NO), application processor 110 is on standby for the generation of the read command (branch "C" in FIG. 14), or read-ahead enhancer 112 is on standby for the enablement of trigger signal TRG (branch "D" in FIG. 14). Where the read command is not generated and trigger signal TRG is additionally enabled, read-ahead enhancer 112 further changes the size of the read-ahead data based on the additionally enabled trigger signal.

In comparison with the example of FIG. 3, in the example of FIG. 14, mobile system 100 awaits both the enablement of trigger signal TRG and the generation of the read command, after the size of the read-ahead data is maintained (e.g., after operation S140) and after the read command is not generated (e.g., after operation S320=NO).

Although the example embodiments are mainly described with reference to trigger signal TRG comprising multiple signals, trigger signal TRG may be a single signal. Where trigger signal TRG is a single signal, a first trigger pulse may be generated on trigger signal TRG where mobile system 100 is connected to the external storage device. The second trigger pulse may be generated on trigger signal TRG where the predetermined application or the predetermined process is executed by mobile system 100. The third trigger signal may be generated on trigger signal TRG where the predetermined data is sequentially read from the external storage device by mobile system 100. The fourth trigger may be generated on trigger signal TRG where the external storage device is disconnected from mobile system 100. The fifth trigger signal may be generated on trigger signal TRG where the execution of the predetermined application or the predetermined process by mobile system 100 is terminated. The sixth trigger signal may be generated on trigger signal TRG where the operation for sequentially reading the predetermined data from the external storage device by mobile system 100 is terminated. In these circumstances, the phrase "trigger signal TRG is enabled" may indicate that at least one trigger pulse is generated on trigger signal TRG. The first through sixth trigger pulses may have different waveforms, respectively, and read-ahead enhancer 112 in FIG. 2 may change the sizes of the read-ahead data based on the first through sixth trigger pulses.

The above described embodiments may be applied to a mobile system using the read-ahead scheme, and particularly to systems such as a mobile phone, a smart phone, a tablet computer, a laptop computer, a PDA, a PMP, a digital camera, a music player, a portable game console, a camcorder, a video player and/or a navigation system. Alternatively, the described embodiments may be adapted for use in other types of electronic data processing systems, i.e., non-mobile systems.

The foregoing is illustrative of embodiments and is not to be construed as limiting thereof. Although a few embodiments have been described, those skilled in the art will readily appreciate that many modifications are possible in the embodiments without departing from the scope of the inventive concept as defined in the claims.

What is claimed is:

1. A method of reading data in an electronic system, comprising:
   detecting whether a trigger signal in the electronic system is enabled, the trigger signal being selectively enabled according to at least one operating condition of the electronic system;
   as a consequence of detecting that the trigger signal is enabled, changing a size of read-ahead data based on the enabled trigger signal; and
   performing a read operation based on a read command and the changed size of the read-ahead data,
   wherein the trigger signal is indicative of whether the electronic system is connected to an external device.

2. The method of claim 1, wherein the electronic system is a mobile system.

3. The method of claim 2, wherein said changing the size of the read-ahead data comprises:
   determining a type of the enabled trigger signal; and
   increasing or decreasing the size of the read-ahead data based on the determined type of the enabled trigger signal.

4. The method of claim 2, wherein the trigger signal comprises a first trigger signal, a second trigger signal, and a third trigger signal,
   wherein the first trigger signal is enabled to indicate that the mobile system is connected to the external storage device, the second trigger signal is enabled to indicate that a predetermined application or process is executed by the mobile system, and the third trigger signal is enabled to indicate that data of a predetermined type is to be sequentially read by the mobile system.

5. The method of claim 4, wherein where at least one of the first, second and third trigger signals is enabled, the size of the read-ahead data is increased.

6. The method of claim 5, wherein where at least two of the first, second and third trigger signals are enabled, the size of the read-ahead data is increased based on the at least two of the first, second, and third trigger signals.

7. The method of claim 5, wherein where at least two of the first, second, and third trigger signals are enabled, one of the at least two of the first, second and third trigger signals is selected, and the size of the read-ahead data is increased based on the selected trigger signal.

8. The method of claim 2, wherein the trigger signal comprises a first trigger signal, a second trigger signal, and a third trigger signal,
   wherein the first trigger signal is enabled to indicate that the external storage device is disconnected from the mobile system, the second trigger signal is enabled to indicate that execution of a predetermined application or process by the mobile system is terminated, and the third trigger signal is enabled to indicate that an operation for sequentially reading predetermined data by the mobile system is terminated.

9. The method of claim 8, wherein where at least one of the first, second and third trigger signals is enabled, the size of the read-ahead data is decreased.

10. The method of claim 2, wherein the size of the read-ahead data is changed according to a type of the external storage device connected to the mobile system, a type of a communication interface between the mobile system and the external storage device, a type of a predetermined application or process that is executed by the mobile system, or a type or size of predetermined data to be sequentially read by the mobile system.

11. The method of claim 4, wherein the external storage device comprises a memory card, a secure digital (SD) card, a multimedia card (MMC), an embedded MMC (eMMC), a compact flash (CF) card, a universal serial bus (USB) storage device, or a camera device.

12. The method of claim 11, wherein the external storage device communicates with the mobile system through a memory card interface, an USB interface, a wireless USB interface, an Ethernet interface, a wireless local area network (WLAN) interface, a Bluetooth interface, near field communication (NFC) interface, radio frequency identification (RFID) interface, or a media transfer protocol (MTP) interface.

13. The method of claim 4, wherein the predetermined application or process comprises a multimedia file player application, a multimedia file editor application, a multimedia file production application, a data download application, a data streaming application, or an installation process for an application.

14. The method of claim 4, wherein the data of the predetermined type comprises a multimedia file or a file having a size larger than a reference size.

15. The method of claim 2, wherein the mobile system is a mobile phone, a smart phone, a tablet computer, a laptop computer, a personal digital assistant (PDA), a portable multimedia player (PMP), a digital camera, a music player, a portable game console, a camcorder, a video player, or a navigation system.

16. An electronic system, comprising:
an application processor configured to
execute an operating system (OS) of the electronic system,
detect a state of a trigger signal in the electronic system,
change a size of read-ahead data based on the detected state of the trigger signal, and
perform a read operation in the electronic system based on a read command and the changed size of the read-ahead data,
wherein the trigger signal is selectively enabled according to an operating condition of the electronic system, and the size of the read-ahead data indicates an amount of data prefetched before the read operation is required in the electronic system; and
a memory device configured to store the OS,
wherein the state of the trigger signal indicates whether a predetermined application or process is to be executed by the electronic system.

17. The electronic system of claim 16, wherein the electronic system is a mobile system, and the state of the trigger signal indicates whether the mobile system is connected to an external device.

18. The electronic system of claim 16, wherein the electronic system is a mobile system.

19. The electronic system of claim 16, wherein the electronic system is a mobile system, and the state of the trigger signal indicates whether data of a predetermined type is to be sequentially read by the mobile system.

20. The electronic system of claim 16, wherein the trigger signal comprises multiple trigger signals respectively indicating whether the electronic system is connected to an external storage device, whether the predetermined application or process is executed by the electronic system, and whether data of a predetermined type is to be sequentially read by the electronic system.

* * * * *